(12) United States Patent
Wolfle

(10) Patent No.: US 8,757,284 B2
(45) Date of Patent: Jun. 24, 2014

(54) LINKAGE ROCKER ARM ON AN AGRICULTURAL VEHICLE

(75) Inventor: Gottlieb Wolfle, Marktoberdorf (DE)

(73) Assignee: AGCO International GmbH, Neuhausen am Rheinfall (CH)

(*) Notice: Subject to any disclaimer, the term of this patent is extended or adjusted under 35 U.S.C. 154(b) by 19 days.

(21) Appl. No.: 13/315,338

(22) Filed: Dec. 9, 2011

(65) Prior Publication Data

US 2013/0127144 A1 May 23, 2013

(30) Foreign Application Priority Data

Dec. 9, 2010 (GB) .................................. 1020863.5

(51) Int. Cl.
*A01B 59/06* (2006.01)

(52) U.S. Cl.
USPC .......................................... 172/439; 280/769

(58) Field of Classification Search
CPC .... A01B 59/06; A01B 59/066; A01B 59/067; A01B 59/068; A01B 59/043; B62D 49/02
USPC .................................. 280/769; 172/439–451
See application file for complete search history.

(56) References Cited

U.S. PATENT DOCUMENTS

| | | | | |
|---|---|---|---|---|
| 2,689,513 A * | 9/1954 | Ferguson et al. | ................ | 172/11 |
| 3,207,529 A * | 9/1965 | Harper | ........................... | 172/450 |
| 3,247,910 A * | 4/1966 | Bunting et al. | ................ | 172/460 |
| 3,834,576 A * | 9/1974 | Heisterberg | .................. | 220/220 |
| 3,905,425 A * | 9/1975 | Jackson | ........................... | 172/321 |
| 4,232,878 A * | 11/1980 | Moore, Jr. | ...................... | 172/449 |
| 4,357,031 A * | 11/1982 | Berg | .............................. | 172/439 |
| 4,470,613 A * | 9/1984 | Sykes | ............................. | 172/450 |
| 4,519,623 A * | 5/1985 | Orthman | ....................... | 172/439 |
| 4,773,666 A * | 9/1988 | Koberlein et al. | ............. | 172/443 |
| 4,944,649 A * | 7/1990 | Stralow | .......................... | 414/686 |
| 5,327,978 A * | 7/1994 | Bremner | ....................... | 172/439 |
| 5,601,146 A * | 2/1997 | Schlegel et al. | ............... | 172/439 |
| 6,044,915 A * | 4/2000 | Schlegel et al. | ............... | 172/439 |
| 6,089,328 A * | 7/2000 | Moore et al. | .................. | 172/447 |
| 6,199,638 B1 * | 3/2001 | Bentley | ......................... | 172/450 |
| 6,230,817 B1 * | 5/2001 | Haugen | ............................. | 172/7 |
| 6,253,859 B1 * | 7/2001 | Coenen | ......................... | 172/448 |
| 6,352,123 B1 * | 3/2002 | Schlegel et al. | ............... | 172/439 |
| 6,352,124 B1 * | 3/2002 | Sancho | .......................... | 172/439 |
| 6,830,110 B2 * | 12/2004 | Schlesser et al. | ................. | 172/8 |
| 7,063,169 B2 * | 6/2006 | Elliott | ........................ | 172/445.1 |
| 7,353,885 B2 * | 4/2008 | Nordhoff | ....................... | 172/272 |
| 7,600,574 B2 * | 10/2009 | Chauvel | ......................... | 172/439 |
| 7,686,097 B2 * | 3/2010 | Mozingo et al. | ............... | 172/450 |

(Continued)

FOREIGN PATENT DOCUMENTS

| | | | | |
|---|---|---|---|---|
| DE | GB 1236797 A | * | 6/1971 | |
| EP | 1886547 A2 | * | 2/2008 | |
| GB | 819912 A | * | 9/1959 | |

OTHER PUBLICATIONS

GB Search Report for GB Application No. 1020863.5 Dated Apr. 5, 2011.

*Primary Examiner* — Hau Phan
*Assistant Examiner* — Jacob Meyer

(57) ABSTRACT

A rocker for operating a rear linkage on an agricultural vehicle. The rocker has a main body and two side rocker arms attached at each end for connection to lift rods. The main body of the rocker is provided with a fluid reserve.

8 Claims, 4 Drawing Sheets

(56) References Cited

U.S. PATENT DOCUMENTS

| | | | |
|---|---|---|---|
| 7,784,558 B2* | 8/2010 | Mozingo | 172/272 |
| 8,347,976 B2* | 1/2013 | Bernhardt et al. | 172/444 |
| 8,382,207 B2* | 2/2013 | Altemeier | 298/22 P |
| 8,544,397 B2* | 10/2013 | Bassett | 111/167 |
| 8,555,995 B2* | 10/2013 | Harris | 172/810 |
| 2004/0140109 A1* | 7/2004 | Schlesser et al. | 172/439 |
| 2004/0188114 A1* | 9/2004 | Schlesser et al. | 172/439 |
| 2005/0028406 A1* | 2/2005 | Elliott | 37/232 |
| 2006/0016611 A1* | 1/2006 | Chauvel | 172/439 |
| 2008/0236234 A1* | 10/2008 | Rusch | 72/149 |
| 2008/0239036 A1* | 10/2008 | Hattori | 347/86 |
| 2008/0314141 A1* | 12/2008 | Keith et al. | 73/290 R |
| 2009/0084566 A1* | 4/2009 | Bernhardt et al. | 172/444 |
| 2009/0272550 A1* | 11/2009 | Mozingo | 172/1 |
| 2012/0060730 A1* | 3/2012 | Bassett | 111/149 |
| 2013/0127144 A1* | 5/2013 | Wolfle | 280/769 |
| 2013/0284470 A1* | 10/2013 | Kaemmerer | 172/810 |
| 2013/0285350 A1* | 10/2013 | Kaemmerer | 280/504 |
| 2013/0298728 A1* | 11/2013 | Gartenmaier et al. | 74/99 R |

* cited by examiner

LINKAGE ROCKER ARM ON AN AGRICULTURAL VEHICLE

CROSS REFERENCE TO RELATED APPLICATION

The present application claims benefit of and priority from United Kingdom Application No. 1020863.5, filed Dec. 9, 2010, the entire disclosure of which is hereby incorporated by reference.

FIELD OF INVENTION

This invention relates to a rocker for operating a linkage on an agricultural machine. More specifically, the invention relates to a rocker for operating a linkage on an agricultural tractor.

BACKGROUND

Agricultural tractors are typically provided with a three point linkage or hitch at the rear of the tractor to which an implement can be attached. The linkage which comprises three links can be moved upwards and downwards. Usually hydraulic cylinders are used to lift and lower the links.

SUMMARY OF INVENTION

The three point linkage comprises a central top link and two side lower links. Each of the lower links are connected to two respective rocker arms by lift rods. The rocker arms can be moved by hydraulic cylinders. When the rocker arms are moved, so the lift rods raise or lower the lower links.

A tractor requires various fluids in varying quantities to be carried on the tractor in fluid reserves. Hydraulic fluids, fuel, cleaning fluids and exhaust treatment fluids need to be carried. With the ever developing need for efficient tractors, space on a tractor is at a premium. Re-arranging components on a tractor to provide extra space for a further or larger component, such as a fluid reserve is a time consuming and costly task.

At the rear of a tractor for example, a canister is used to collect hydraulic oil which leaks from the hydraulic couplings. The installation of a canister on a tractor has space and cost implications.

It is an object of the invention to overcome, or at least alleviate the problems associated with the storage of fluids on a tractor.

According to the invention there is provided a rocker for operating a rear linkage on an agricultural vehicle, wherein said rocker is adapted to store fluids.

Preferably, the rocker comprises a central cavity in which a fluid is stored.

More preferably, the rocker is provided with at least one fluid inlet or outlet.

The rocker may be adapted to receive tubing. This way fluid can be delivered to, or from a desired component on the vehicle.

Preferably, the rocker is an hydraulic oil reserve. More preferably, the rocker is a leak oil reserve which collects oil leaking from the hydraulic couplings.

The tractor does not therefore need a canister to store the leak oil thus saving money and space.

Preferably the rocker is provided with means for showing the volume of liquid stored in the rocker. Therefore, if the cavity of the rocker is full it can be emptied.

BRIEF DESCRIPTION OF THE DRAWINGS

The invention will now be described, by way of example only with reference to the following drawings in which.

DESCRIPTION OF EXAMPLE EMBODIMENT

Figure 1:
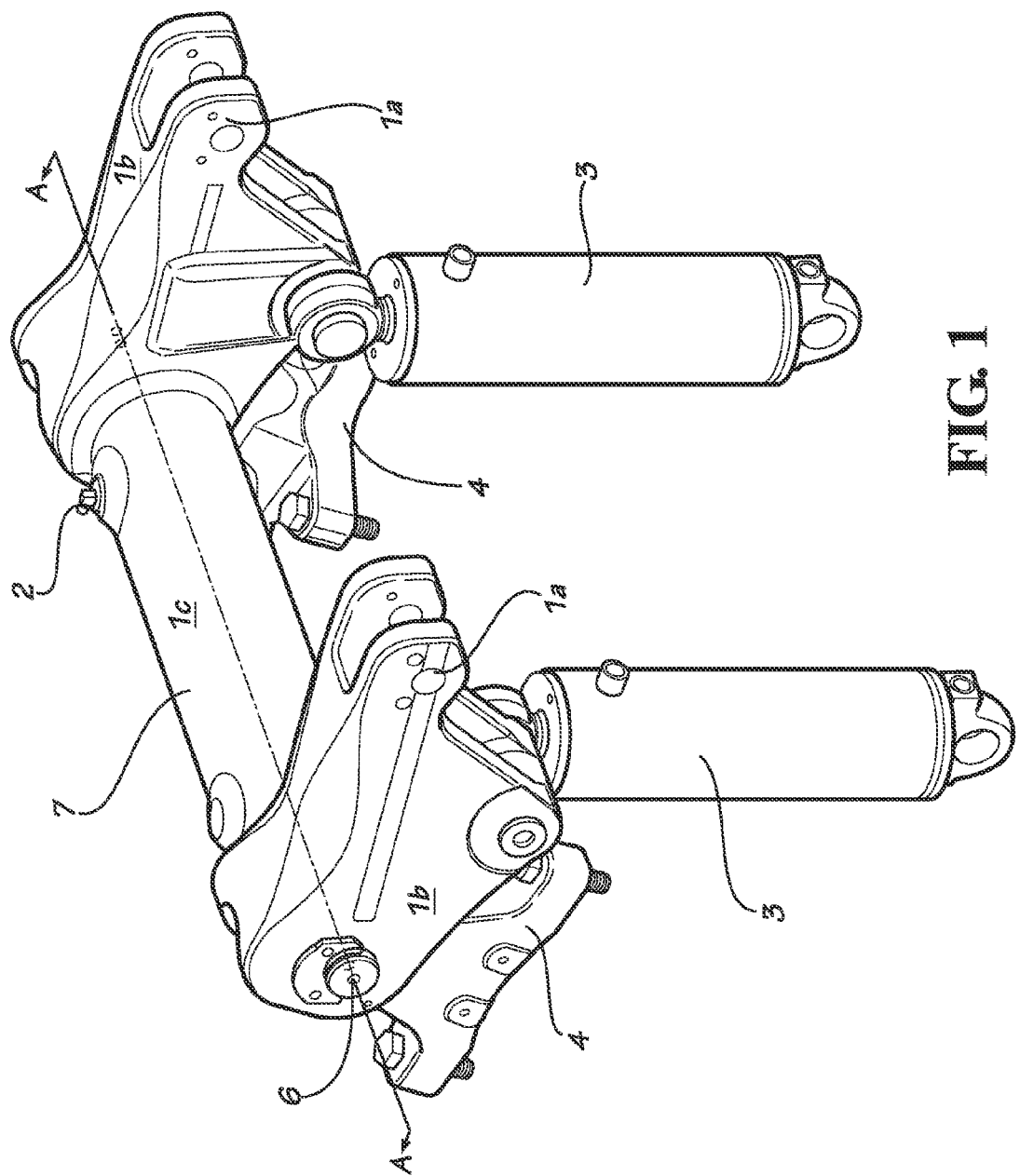
FIG. 1 shows a perspective view of a linkage rocker in accordance with the invention which can be mounted to an agricultural tractor.
Figure 3:
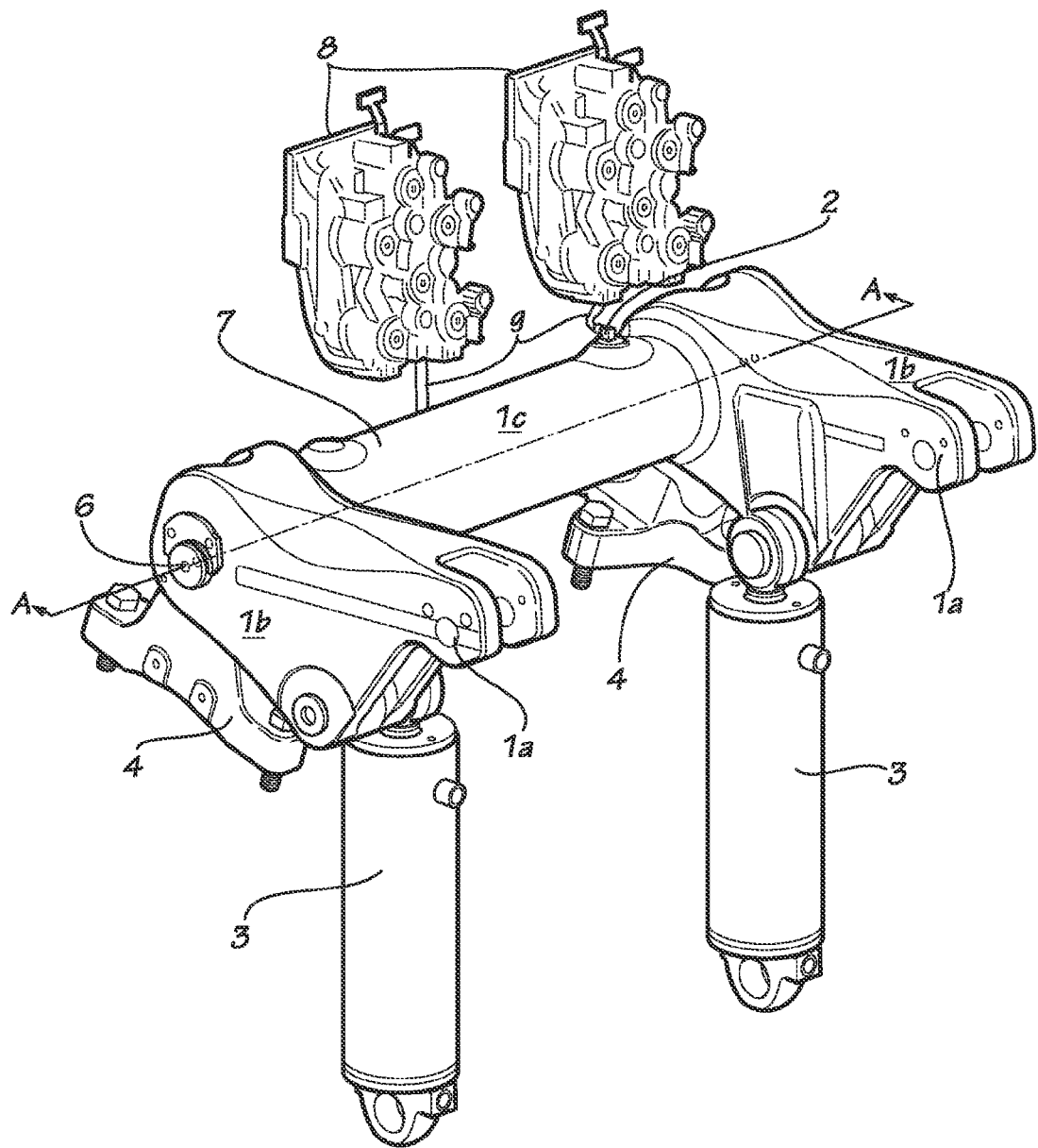
FIG. 3 shows a perspective view of the linkage rocker of FIG. 1 further showing hydraulic couplings on a tractor.

FIGS. 1 and 3 show a rocker 1 which can be mounted to the rear of an agricultural tractor (not shown). Rocker 1 is a cast part used to raise and lower links (not shown) which may be fitted to the tractor. The rocker 1 comprises a main body 1c and two side rocker arms 1b. Rocker arms 1b are pivotally attached to a rocker mounting 4 by bearing pins 6 and can be pivoted about axis A to lift and lower lift rods (not shown) which are attached to lift rod mountings 1a on the rocker arms 1b. The lifting rods are attached to lower links. By activating lifting cylinders 3, rocker arms 1b and therefore the lower links are lifted or lowered.

The rocker 1 is mounted to the rear of a tractor by rocker mounting 4. The main body 1c has a cylindrical cavity 7 in which a fluid 7a may be stored. The fluid for example may be hydraulic oil, pressurised air, or a cleaning fluid such as a windscreen cleaning fluid. The main body 1c is provided with two inlets/outlets 2 through which a fluid can enter, or exit the cavity 7.

In FIG. 3, two sets of hydraulic couplings 8 are shown. These are mounted to the rear of a tractor and provide a supply of hydraulic oil to a towed trailer, or implement. Typically, any leakage from these couplings would be transported away from the couplings in tubing to a separate canister mounted to the tractor. With the present invention, the leakage oil can be transported by an inflow line 9, for example plastic tubing through inlets 2 into the rocker cavity.

Figure 2:
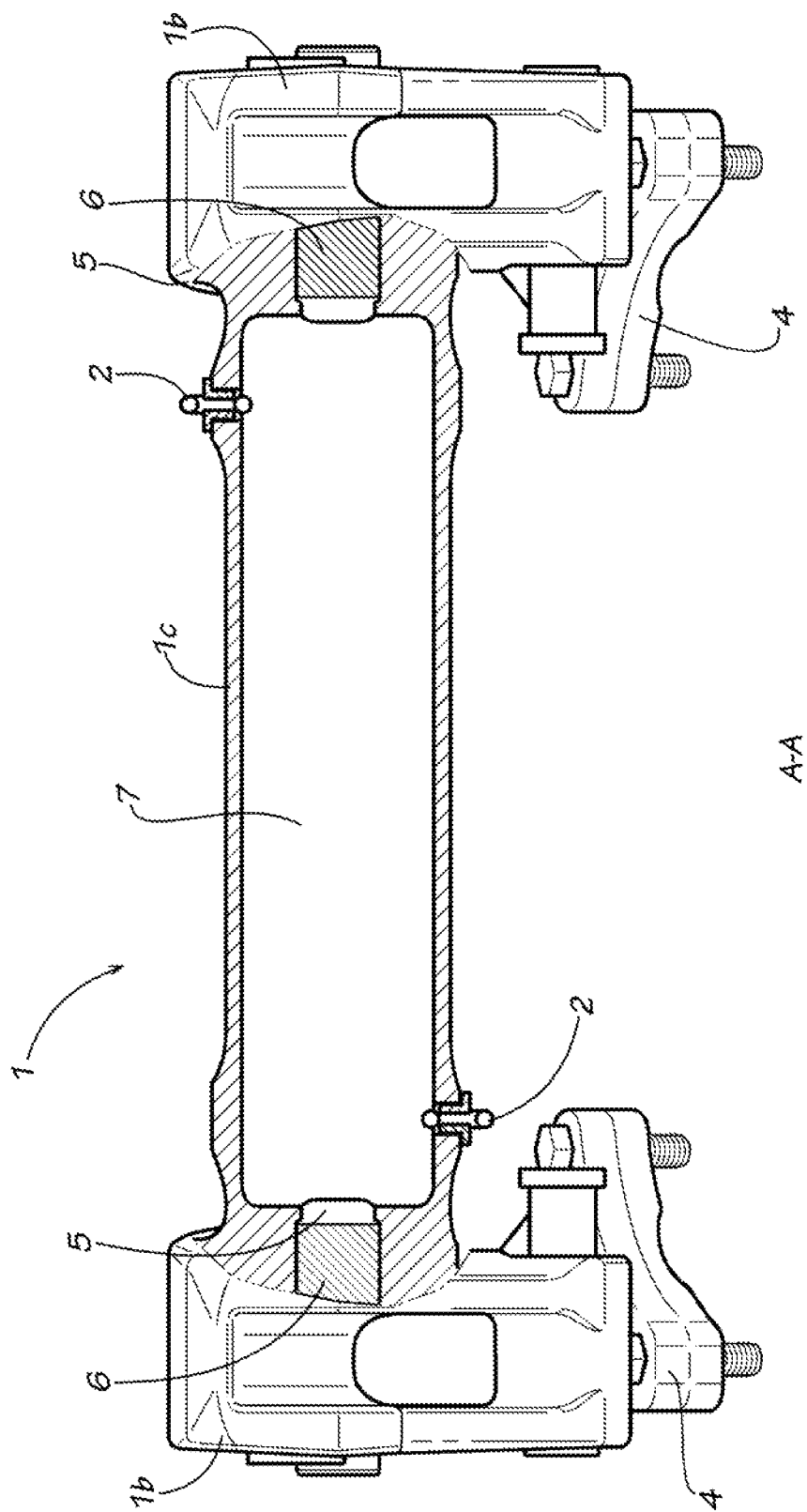
FIG. 2 shows a cross sectional view of FIG. 1 along line A-A.

FIG. 2 is a cross sectional view of FIG. 1 along line A-A. The main body 1c of the rocker is a cavity 7 in which fluid may be stored.

Figure 4:
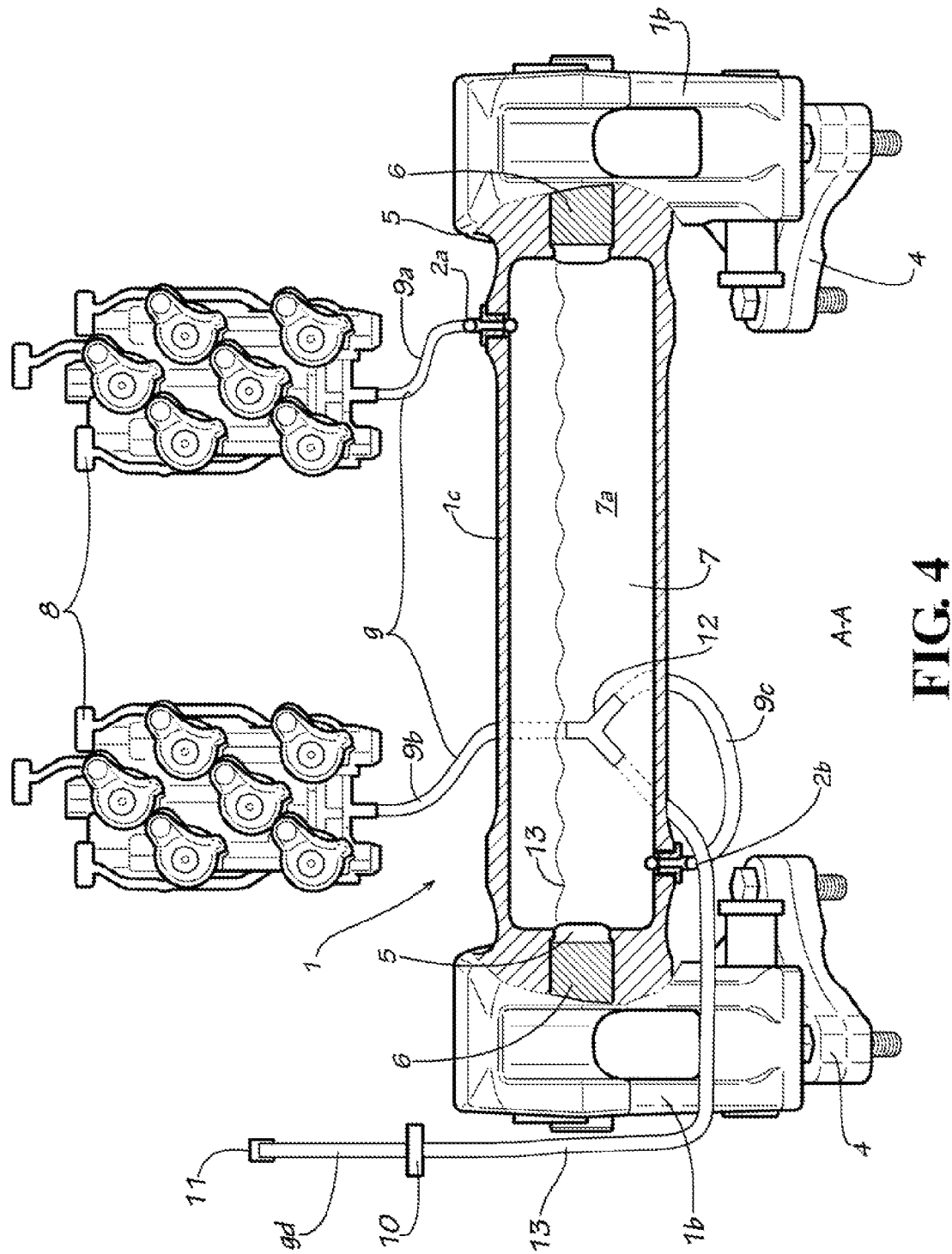
FIG. 4 shows a cross sectional view along line A-A of FIG. 3.

FIG. 4 is a cross sectional view of the rocker of FIG. 3 together with a perspective view of hydraulic couplings 8. Leakage oil from the couplings 8 are transferred by inflow lines 9a and 9b through the two inlets 2a and 2b into the cavity 7. One inflow line 9a is connected to an inlet 2a situated on the top of the rocker. Inflow line 9b is connected to a Y-piece 12 which is located behind the rocker. The Y-piece 12 is connected to a further inflow line 9c and an outflow line 9d. Inflow line 9c is connected to inlet 2b for filling the cavity 7. Outflow line 9d is for emptying the cavity.

Outflow line 9d is attached to the tractor in a substantially vertical manner by mounting clip 10 and the end of outflow line 9d is covered by a cap 11. Since outflow line 9d is connected to inflow line 9c which is connected to the bottom of cavity 7, the height of the fluid 13 in outflow line 9d is the level of the fluid 13 in the cavity 7. When the height of the fluid 13 in outflow line 9d is higher than the top of the rocker, cap 11 can be opened to empty the fluid from the cavity 7. Covers 5 are attached by adhesive, or other means to seal the cavity 7. Alternatively, an O-ring could be mounted on bearing pins 6 to seal the cavity.

Inflow and outflow lines 9*a*, 9*b*, 9*c* and 9*d* may comprise of, for example a transparent, flexible tubing.

As an alternative to inlets 2*a* and 2*b* to fill the cavity 7, a bore may be made through bearing pins 6 as an inlet for receive tubing for delivering fluid into the cavity 7. Covers 5 or an O-ring may be mounted to the bearing pins 6 to seal the cavity 7.

The cavity 7 can store approximately 3.6 liters of fluid. Given that walls of the rocker are thick the rocker cavity could also be used to store pressurised air.

Although not shown in the drawings, the cavity 7 could be divided into two or more fluid reservoirs for holding two or more fluids. Each reservoir would be provided with an associated inlet/outlet.

What is claimed is:

1. A rocker for operating a rear linkage on an agricultural vehicle, wherein said rocker comprises a main cylindrical body and two side rocker arms fixed at each end thereof, said side rocker arms for connection to lift rods, wherein said main body of the rocker forms a cavity at least partially filled with a fluid.

2. A rocker as claimed in claim 1 wherein the main body of the rocker is provided with at least one fluid inlet.

3. A rocker as claimed in claim 2 wherein the inlet comprises a bore through a bearing pin of the rocker.

4. A rocker as claimed in claim 3 wherein the inlet is connected to an inflow line carrying fluid into the rocker and wherein the inflow line is connected to an outflow line for emptying fluid from the rocker.

5. A rocker as claimed in claim 4 wherein the outflow line indicates the amount of fluid stored in the rocker.

6. A rocker as claimed in claim 1 wherein the fluid is at least one of hydraulic oil, windscreen cleaning fluid, or pressurised air.

7. A rocker as claimed in claim 5 further comprising a pair of side lifting cylinders with each one of said lifting cylinders attached to a respective one of the two side rocker arms, the side rocker arms being pivotally attached to a rocker mounting such that the rocker is pivotable about a transverse axis through the main body, the rocker to lift or lower lift rod mountings on distal ends of the side rocker arms.

8. An agricultural vehicle comprising the rocker of claim 7, the agricultural vehicle further comprising at least one hydraulic coupling, wherein hydraulic fluid from the hydraulic coupling is carried by the inlet line to the cavity in the rocker.

* * * * *